Feb. 21, 1933.  C. W. GREEN  1,898,049
CASH REGISTER
Filed July 2, 1926  4 Sheets-Sheet 1

Inventor
Charles W. Green

By A. A. Wicks
H. C. Diserud  Attorneys

Feb. 21, 1933.   C. W. GREEN   1,898,049
CASH REGISTER
Filed July 2, 1926   4 Sheets-Sheet 2
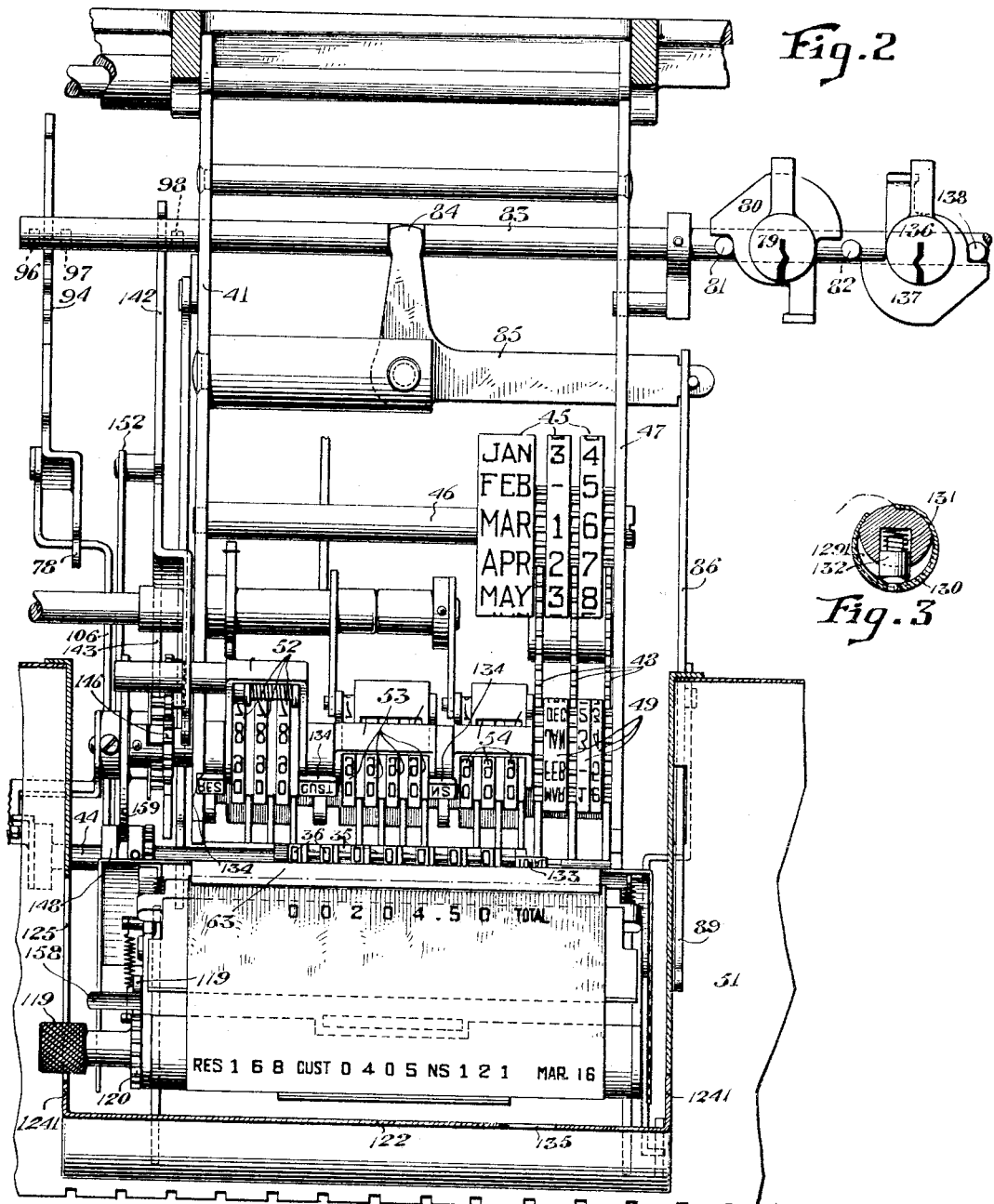
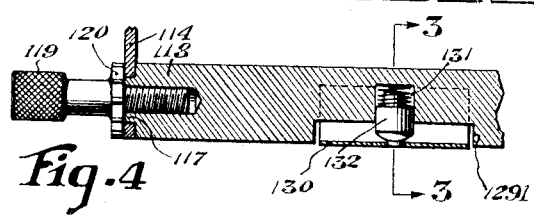
Inventor
Charles W. Green
by A. A. Dicke
H. C. Dieserud
Attorneys Feb. 21, 1933.  C. W. GREEN  1,898,049
CASH REGISTER
Filed July 2, 1926   4 Sheets-Sheet 3
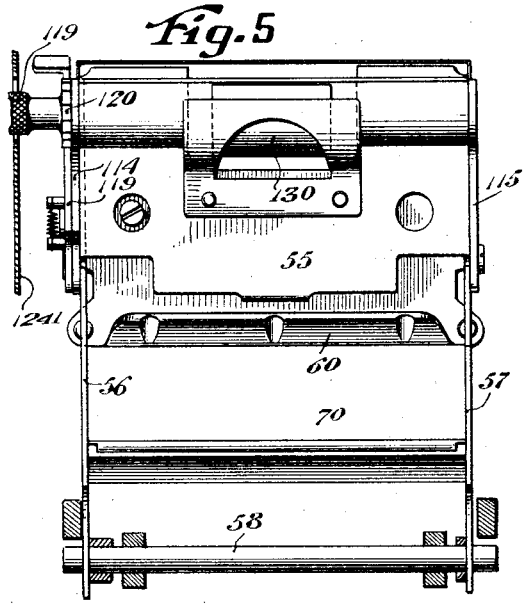
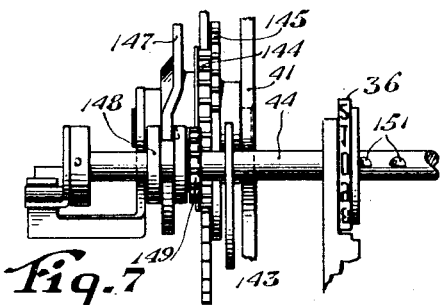
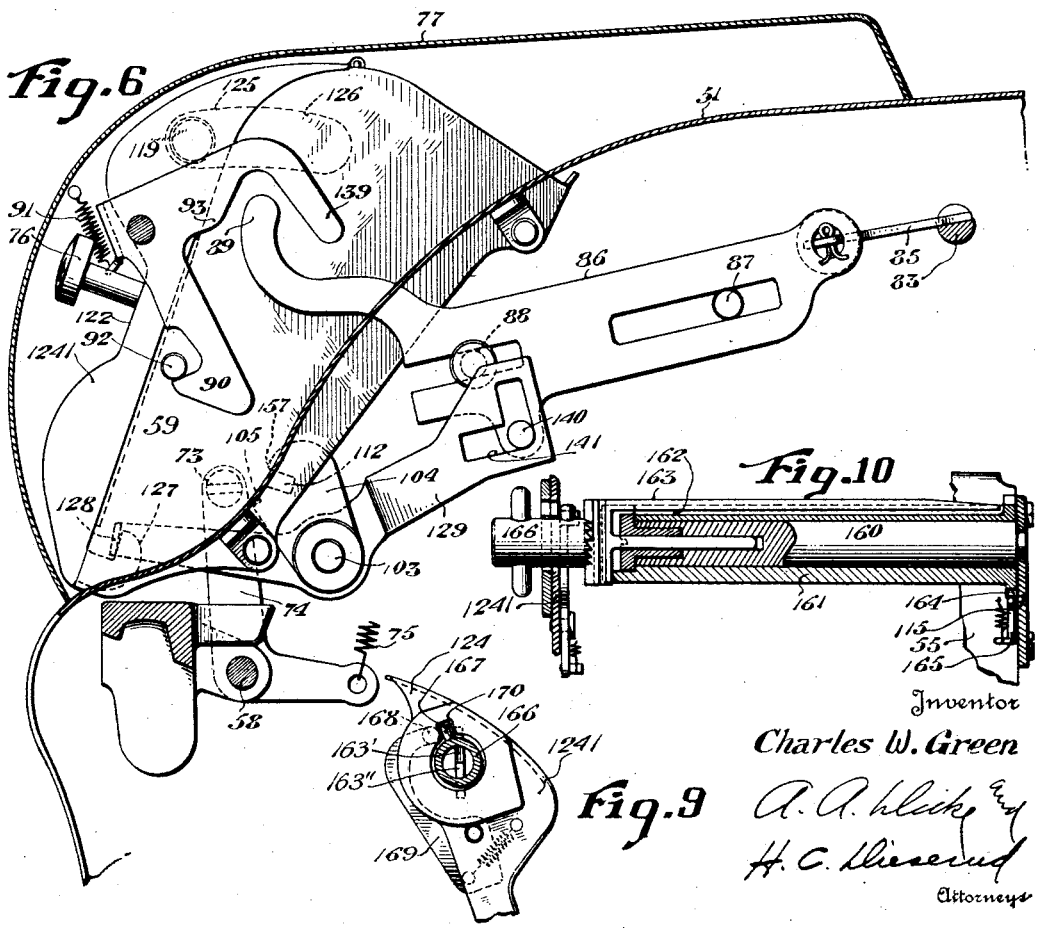
Inventor
Charles W. Green

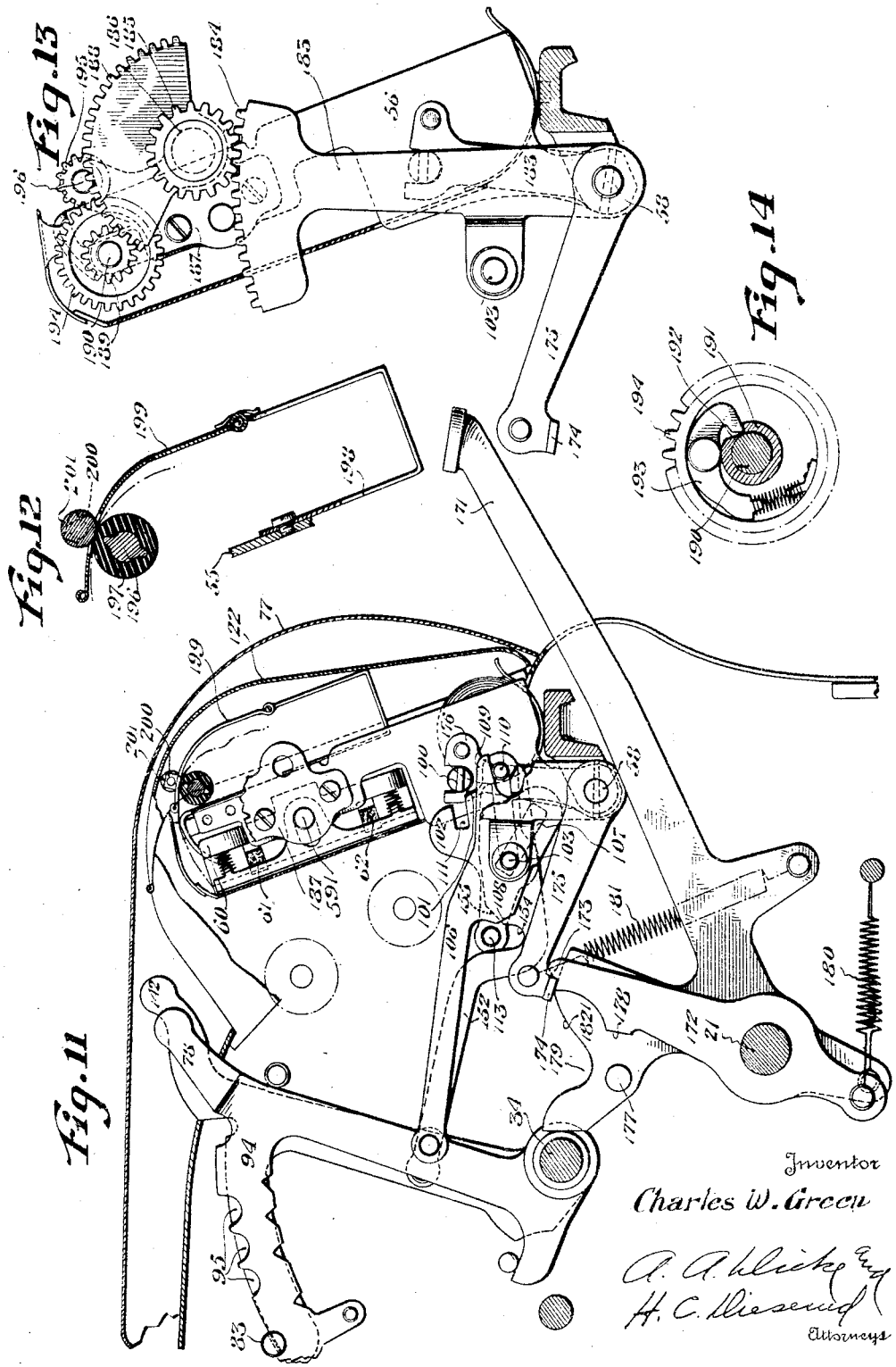

Patented Feb. 21, 1933

1,898,049

UNITED STATES PATENT OFFICE

CHARLES W. GREEN, OF ILION, NEW YORK, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 2, 1926. Serial No. 120,023.

This invention relates to cash registers and accounting machines generally, and more particularly to that class employing printing devices for printing the totals.

The main object of the present invention is to provide an improved mechanism whereby the totals may be printed by an operator but are normally obstructed from view by a concealing device and, in connection with the concealing device, it is an object to include an auxiliary control so that the printed totals may be rendered visible.

The present register has been designed particularly for use in chain stores, department stores, or the like, where the supervision of a number of registers is controlled by some person generally known as the "auditor". The printing of a total is placed under the control of a "manager" of a chain store while periodically the "auditor" resets the totalizer for the next accumulation of the items comprising a subsequent period of business. Where totals are printed daily, for example, and where the printed totals are not followed by resetting operations the total printed will be a "running" total and the difference between the successively printed totals will be the total of the sales for the corresponding day.

It is specifically an object of the present invention to construct the register so that the totals may be readily printed by the manager of the store and the printed record strip may be manually wound upon a receiving roller. In connection with the paper winding mechanism, it is also an object of the present invention to provide indicating means whereby the operator will know when sufficient paper has been withdrawn from the supply roll so that a fresh portion is presented to the printing type.

Another object of the invention is to include a suitable cover for the various manipulative devices, such as a control lever and a resetting lever with means whereby under the control of a plurality of locks one lock may unlock the main cover and one of the levers located beneath the cover, while a supplemental lock is adapted to unlock the main and a supplemental cover and both levers. In conjunction with the releasing mechanisms for the covers it is an object of the present invention to provide means whereby when the actuating device for the lid catches is shifted in one direction by means of one lock, only one lid will be released, but when the actuating device for the lid latches is moved in the reverse direction by the other lock both lids will be released. The result of the mechanisms just described is that when a certain lock is operated the main cover and control lever will only be unlocked but when the supplemental lock is operated the main and supplemental cover catches are both disabled and the control and resetting levers are simultaneously unlocked.

Still another object of the present invention is to provide interlocking devices between the operating keys, total taking means and resetting devices so that the proper operation of all of these devices will be insured and any irregular operations which would result in the printing of an incorrect total, or an improper resetting operation, are effectively prevented.

The description of the machine has throughout the specification contemplated its use in a store which is a unit of a chain store system and the terms "manager" and "auditor" are employed as illustrative of such use, but it will be understood that these terms are employed merely by way of example, and for simplicity and clearness, as the invention is of great utility in many other classes of work where the different functions of the machine are to be controlled by different persons.

For example, the improved machine may be installed in a store in which the responsibility of correct records lies upon one person. In his absence he may delegate the responsibility of obtaining a printed total and a subsequent clearing operation upon a subordinate, and by the employment of the novel constructions of the invention he will be able, to a great degree of certainty, to know that no one else will obtain the information to which he is not entitled.

With these and incidental objects in view the invention consists in certain novel features of construction and combination of parts, the essential elements of which are set forth in the appended claims and a few preferred forms of embodiment of which will now be described with reference to the drawings which accompany and form part of the specification.

Of said drawings:

Fig. 1 is a section of the machine taken substantially through its mid-portion. This view shows particularly the differential mechanism, the totalizing devices and their relation to each other, as well as a section through the printing mechanism provided for effecting printing from the totalizing devices. There is also illustrated the control lever, the resetting lever and the interlocking mechanism provided to insure proper operations of the various manipulative devices.

Fig. 2 is a plan view of the machine, the cabinet having been removed. This view shows the details of the construction of the locking devices for the control and resetting levers whereby they may be unlocked singly or together. This view also illustrates the date setting wheels, associated printing wheels and the consecutive numbering printing wheels. There is also shown a sample of the printing effected by the total printing devices.

Fig. 3 is a sectional view taken on the line 3—3 of Fig. 4.

Fig. 4 is a detail of the paper winding roller and also illustrates the novel clamping device for positively attaching the record strip to the receiving roller.

Fig. 5 is a front view of the printer frame showing how the winding roller is supported by the printer.

Fig. 6 is a sectional view showing the various lids for concealing the different portions of the mechanism and shows the associated lid releasing devices.

Fig. 7 is a detail of the totalizer shaft shifting devices effective during resetting operations.

Fig. 8 is a sectional view showing the relation between one of the totalizer pick-up pawls and the shifted totalizer resetting shaft.

Fig. 9 is a view in side elevation showing a modification of the paper winding devices.

Fig. 10 is a fragmentary sectional view showing details of construction of a modification of the paper winding devices.

Fig. 11 is a sectional view, in side elevation, illustrating another modification of the present invention which utilizes a single operating device for effecting total printing impressions and automatically depositing the printed portion of the record strip in a receptacle.

Fig. 12 shows a detail of the record receiving receptacle and also illustrates the paper feeding rollers in co-operation with the record strip.

Fig. 13 is a view in side elevation showing the driving mechanism for the feeding rollers.

Fig. 14 is a sectional view showing the one-way connection between the driving gear and the driven gear comprising part of the train of mechanism for driving the feeding rollers.

Figure 1:
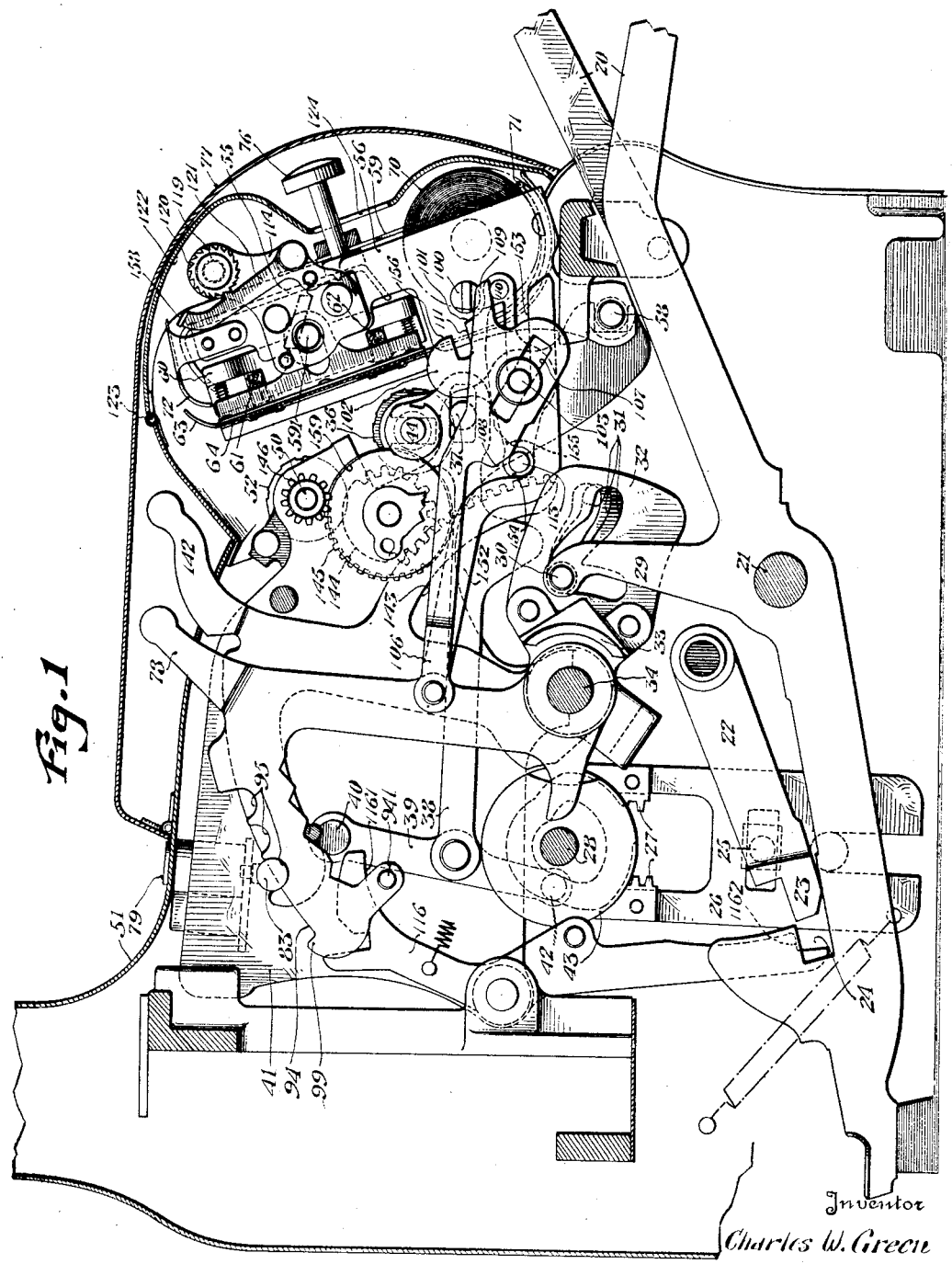

For convenience of description the principal elements will first be enumerated and their general purpose, arrangement and co-operation will be briefly explained in order to indicate the general operation of the machine as a whole, after which the preferred construction of these parts will be described more in detail together with their functions.

Briefly, stated in general terms, the invention relates to a key operated cash register having a plurality of banks of amount keys all of which have connections to operate a differential mechanism so as to insert the item in a totalizer. As is usual in this class of machine when the keys are operated they are connected to a key coupler which has connections to drive a power shaft from which the various parts of the mechanism are operated.

During each operation of the machine the amount represented by the operated keys will be entered in the totalizing devices. At the termination of a day's business, for example, the barrel of a lock is rotated so that a main cover is released which permits access to a control lever located beneath the cover. Positioning of the control lever to the "total" position conditions the machine for total printing which is effected by the depression of a knob extending from the front of the printer casing.

After printing the paper is manually wound upon a spool by means of a knurled knob projecting through a supplemental cover the latter effectively concealing the printed record strip against inspection. After each total printing operation which may be effected whenever desired the printed portion of the record strip is wound upon the receiving roller.

A supplemental lock is provided which unlocks the main cover, as well as the supplemental cover and in addition, unlocks a resetting lever. In order to restore the totalizer elements to zero the resetting lever is manipulated and in order to insure that the printing mechanism and resetting devices are not improperly operated suitable interlocking devices are provided so they cannot be operated simultaneously. The person having the key control of the supplemental lock is able to detach the printed record strip from the winding roll, which is located under the supplemental cover, and is then able to condition the machine so that it is capable of accumulating items pertaining to a subsequent period of business.

The general organization and operation of the machine as a whole having thus been outlined the preferred construction of the various parts above referred to will now be described in detail.

*Keys, key coupler and driving mechanism*

The illustrative machine is provided with a series of amount keys for entering items into the machine, each key 20 (Fig. 1) being pivoted upon a shaft 21. Resting upon the rear ends of each of the keys is a key coupler 22 provided with a nose 23 co-operating with notches 24 formed in the rear ends of each of the operating keys. When the forward ends of the operating keys are depressed the key coupler is rocked clockwise and the nose 23 enters the notches 24 of the depressed keys.

Connected to the key coupler at 25 is a vertical reciprocating rack plate 26 provided with oppositely facing rack teeth 27 which alternately mesh with a gear fast to a driving shaft 28. The arrangement of this mechanism is such that a reciprocation of the key coupler 22, by the keys, will effect a complete rotation of the shaft 28. The mechanism just described is well known in the art and shown in many patents and is similar in construction to that illustrated in the patent to Raymond E. Rice #1,554,761, patented Sept. 22, 1925.

*Differential mechanism and totalizer*

Each amount key 20 is provided with an upwardly extending arm 29 carrying a suitable anti-friction roller 30 co-operating with a differential slot 31 formed in a cam plate 32. The cam plates, of which there is one for each key of a group, are carried by a frame 33 loosely mounted upon a shaft 34, the frame having attached thereto a rack (not shown) adapted to engage at the desired time a pinion 35 (Fig. 2) attached to a printing totalizer element 36. There is a segmental frame 33 for each group of keys and each differentially adjust its associated rack.

The totalizer embodied in the machine as shown in the drawings comprises a frame which is pivoted at 37 (Fig. 1). This is the pivotal point of the totalizer frame and the latter is adapted to rock about this point as a center to bring the totalizer pinions 35 into engagement with the actuating racks at the proper time.

In order to mesh the totalizer pinions 35 with the racks there is slidably mounted on the pivot pin 37 a bar 38 which is connected at its rear end to the mid-point of an arm 39 pivoted on a stud 40 carried by the side frame 41. The lower end of the arm 39 carries a stud 42 adapted to engage a slot formed in the box cam 43 fast to the rotation shaft 28 while, the forward end of the bar 38 has a bifurcated extension at the top to engage a shaft 44 which is the supporting shaft for the totalizer wheels and pinions.

During the downward stroke of the keys the shaft 28 will be rotated clockwise, as viewed in Fig. 1, and due to the configuration of the slot in the box cam 43 the bar 38 will be drawn rearwardly early in the depression of the keys so as to rock the totalizer frame about its pivotal point 37 to bring the totalizer pinions 35 into mesh with the actuating racks, which are then differentially operated under the control of the keys. During the return stroke of the keys the box cam will again act upon the bar 38 forcing it forward thereby withdrawing the totalizer pinions from engagement with the racks and leaving the printing totalizer wheels 36 in their differentially adjusted positions.

*Date printing wheels and associated setting devices*

It is desirable when the total amount of sales and other information is printed upon a record bearing material that some means be provided to designate the date to which the information pertains, or in some cases to show that it relates to some arbitrary period.

For this reason the present register includes a series of date setting devices in the form of adjustable wheels 45 (Fig. 2) which are adjustable so as to set type wheels for printing the date including the name of the month and the day. The setting wheels 45 are mounted upon a shaft 46 extending between the frame 41 and a parallel frame 47. Each adjusting wheel 45 has integral therewith a pinion adapted to mesh with the teeth of a co-operating pinion 48 which is loosely mounted upon a stud fast to the side frame 47. The intermediate pinions 48 mesh with pinions attached to printing wheels 49 formed with raised printing characters and which are loosely mounted upon a shaft 50 (Fig. 1) carried by the intermediate frames 41 and 47.

It will be understood that the interior mechanism is concealed and guarded against improper manipulation and adjustment by the usual form of cabinet 51, an aperture being formed in the cabinet to permit the adjustable wheels 45 to project through so as to be exteriorally adjusted. By means of the date printing wheels 49 the desired date may be printed upon the record bearing material when the printing mechanism is operated as will be hereinafter explained.

Consecutive numbering counters and operating devices

The illustrative machine is provided with a series of consecutive numbering devices which are adapted to register the total number of times the machine has been operated, the number of times the "no sale" key has been operated, and the number of resetting operations which have been performed. The printing wheels associated with the "reset" counter are designated by reference character 52 (Fig. 2), the printing wheels associated with the "customer" or machine operation counter by reference character 53, while reference character 54 denotes the wheels associated with the "no sale" counter. These counters are of the regular multitined pawl deep-notch transfer type, well known in the art and described in many patents, one of which is the patent to Thomas Carney #876,295 patented January 7, 1908.

The counters and the means for operating them, form no part of the present invention and it is not essential that they be present in the machine to which the present improvements are applied, since the invention may be practiced with or without the employment of the special counters. For this reason the associated operating connections are not described or shown in detail but for further information reference may be had to the application of Charles W. Green, Ser. No. 13,470, filed March 6, 1925.

Printing mechanism

In cash registers of the class shown and described the total of the sales registered and other information is frequently obtained by merely reading the amounts standing upon the totalizer elements or the numbering devices and then jotting down these numbers upon a pad. It is preferable, however, to have this information printed upon a record bearing material as it then forms a permanent record which may be referred to at any desired time. For this reason the illustrative machine is provided with a simple and effective printing mechanism for printing the desired information upon a strip of paper.

In general the printing mechanism comprises a printing frame which is pivotally mounted and adapted to be normally swung about its pivot by the use of a knob or key to carry a pair of impression elements, as well as the record strip and suitable inking ribbons against the two lines of printing type, which, as already described comprise the printing elements associated with the totalizer, the dating wheels, and if so desired, the total printing elements associated with the consecutive numbering counters, 52, 53 and 54. The construction and operation of the various elements comprising the printer will now be generally described.

Referring to Fig. 5 it will be noted that the printing frame comprises a plate 55 integral with which are two side plates 56 and 57, the lower ends of which are apertured to receive a shaft 58 carried by the framework of the machine. All of the associated printing members are carried by the printer frame just described. Journaled in the side plates 56 and 57 at their upper portions, is a shaft 159 forming the pivotal point of a platen 60 (Fig. 1) provided with two parallel rubber impression blocks 61 and 62.

The inking ribbons are each mounted in a frame which is carried by two parallel supporting plates 63 and 64 which are attached to each other by any suitable means, such as rivets or bent lugs. For further details of the construction and mounting of the ribbon devices reference may be had to the disclosure of the co-pending application of Charles W. Green before-mentioned.

The paper strip on which printing is effected is drawn from a roll 70 (Fig. 1) resting upon a curved plate 71, the paper being drawn upwardly between the platen and the inking ribbons and over a guide plate 72, and then being wound upon a storage roller, as will be explained in detail hereinafter.

In order to retain the printer frame and the parts carried thereby in their forward or normal position the side plate 57 has attached thereto, by means of a locking lug 73 (Fig. 6) a bell-crank 74 loosely mounted upon the pivotal shaft 58 of the printer. A spring 75 is attached to one arm of the bell-crank and is connected at its other end to the machine frame, the tension in the spring normally retaining the printing devices in the position shown in Fig. 1.

In order to permit the printing mechanism to be forced rearwardly so as to take a printing impression from the adjusted type carriers there is provided a printing button 76, which as shown in Fig. 1 is slidably mounted in a cover 59 fixed to the machine cabinet 51, the cover 59 (see also Fig. 6) being so arranged as to cover all parts of the printing mechanism and being apertured only to permit access to the paper supply roll and the storage roll. The rearward portion of the button 76 contacts with a portion of the printer frame, which in the present instance comprises the horizontal plate 55.

It will be assumed that the machine has been conditioned for total printing and the record strip has been properly inserted and the ribbon frames are also in their proper places. To effect a total printing impression the button 76 is depressed sharply and will force the printing device rearwardly thereby tensioning the spring 75. As the printing frame is forced rearwardly the platen 60 and the rubber impression blocks 61, 62 will strike their associated printing lines, comprising the totalizer elements and the special counter elements, thereby forcing the paper against the inking ribbons and adjusted type.

After the printing impression has been effected the paper is wound upon a storage roll in a manner which will be described hereinafter.

Cabinet and cabinet covers

In machines of the class described it is a common practice to provide a cabinet cover for concealing the interior mechanisms, the cabinet proper having hinged thereto suitable covers which permit access to the various parts. The machine to which the present invention has been applied is provided with the cabinet 51, the cabinet being suitably apertured to receive the printer frame and having rigidly attached thereto the previously mentioned fixed cover 59 (Fig. 1). As stated hereinbefore the printer button 76 projects through the fixed cover 59 and if no preventive means were provided, unauthorized persons would be able to manipulate it to obtain a total printing impression thereby obtaining information to which they are not entitled. For this reason the machine is equipped with a hinged cabinet cover 77 which conceals the date setting wheels and other parts which project through the cabinet 51 and are accessible by reason of the apertures formed in the cover 59. Located under the cabinet cover 77 is an adjustable control lever 78 which, when brought to a certain predetermined position will unlock the printer button 76 for operation. When the cover 77 is in its normal and locked position, access cannot be had to the control lever 78 to release the printer frame for operation, a lock being provided whereby the cover 77 will be unlatched and the control lever simultaneously released so that the latter may be brought to the desired position to release the printer frame for operation.

From Fig. 1 it will be observed that the cabinet cover 77 is hinged at its rearward end to the cabinet 51. In order to latch the cover 77 the following mechanism is employed, being illustrated in detail in Figs. 2 and 6. Reference character 79 denotes a lock which projects through the machine cabinet so that a cam 80 attached to the barrel of the lock may be suitably rotated. The cam 80 co-operates with pins 81 and 82 carried by a shiftable shaft 83 and cooperating with a notch 84 in the shaft 83 is a bell-crank 85, one end of which projects through the side frame 47, its end being connected to a shiftable plate 86, the latter being guided by guide studs 87 and 88, (Fig 6) carried by the frame 47. The shiftable plate 86 is provided with an extension 89 which passes through a slot in the cabinet 51 close to the right side of the printer cover 59. In order to hold the cover 77 latched the cover is provided with a catch 90, the catch being urged by a spring 91 to engage a stud 92 carried by the printer cover 59. The catch 90 is provided with a cam portion 93 adapted to co-operate with the extension 89. To summarize the operation of the above, when a person who has the key of the lock 79 desires to unlock the cover 77 he inserts the key in the lock and turns the barrel clockwise, as viewed in Fig. 2. The action of the cam 80 upon the studs 81 and 82 will be such as to shift the shaft 83 to the right. This will rock the bell-crank 85 clockwise so as to force the plate 86 (Fig. 6) forwardly and through the extension 89 co-operating with the cam portion 93 will rock the catch 90 counter-clockwise so as to disengage it from the stud 92. The cover 77 is now unlocked and may be lifted upwardly to give access to the printer button 76 and the control lever 78 which is simultaneously unlocked with the cover 77 as will now be described.

Total printing

The control lever 78 is adapted to have control over certain other mechanisms, which will not be described in the present application since they comprise no part of the present invention. However, in order to be able to print a total the control lever 78, in the present instance, must be moved to what is known as the "total" position in order to unlock the total printing button 76. The control lever 78 is scalloped to form three semi-circular notches 95 (Fig. 1) which are associated with the three rearmost positions of the control lever, the lever being shown in Fig. 1 in the forward one of these positions and in Fig. 11 in the "total" or extreme forward position. The shaft 83 (as shown in Fig. 2) is provided with three slots 96, 97 and 98, it being noted that the notch 96 is normally out of the plane of the rearward extension 94 of the control lever 78. When the shaft 83 is shifted to the right the notch 96 will be brought in the plane of the control lever permitting the control lever 78 to be brought forwardly to the "total" position, it being stopped by the co-action of a shoulder 99 with an integral portion of the shaft 83.

In order to lock the printing mechanism against operation when the control lever 78 is away from the "total" position, the following mechanism is employed. The side plate 56 of the printer is provided with a locking lug 100 adapted to co-operate with a locking edge 101 of a locking member 102 attached to a shaft 103 which passes between the frames 41 and 47 the shaft having attached at its other end a similar locking arm 104 (Fig. 6) provided with a locking edge 105 adapted to co-operate with the lug 73 previously referred to. From the above, it will be clear that if an attempt to operate the printer by operating the button 76 were made while the parts are in the positions shown in Figs. 1 and 6, it will be prevented by the lugs 100 and 73 contacting with the associated locking edges 101 and 105 of the locking arms 102 and 104, respectively. The control lever 78 (Fig. 1) has attached thereto a member 106 which is provided with an inclined slot 107 embracing the shaft 103 and in addition, has a camming portion 108 on its lower edge. When the control lever 78 is moved to the "total" position (Fig. 11) the member 106 will be moved forwardly and downwardly due to the inclination of the slot 107 so that a projection 109 integral with the member 106 will contact with a stud 110 carried by the locking member 102 thereby rocking the member 102 and shaft 103 in a clockwise direction, as viewed in Fig. 1. This will bring a notch 111 formed above the locking surface 101 of the member 108, to co-operate with the locking lug 103 (Fig. 11) and referring to Fig. 6, it will also bring a notch 112 formed above the locking edge 105 of the member 104, into co-operative relationship with the locking lug 73. The printing devices can now be moved rearwardly to effect a printing operation since there will be no intereference with the studs 73 and 100. When the control lever has been adjusted to the "total" position and then restored rearwardly the cam edge 108 co-operating with another stud 113 carried by the locking member 102, will positively rock the member 102 and shaft 103 counter-clockwise again bringing the locking edges 101 and 105 into co-operative relationship with their associated locking lugs 103 and 73, respectively, to again lock the printing devices against operation.

*Auditor's control system*

As far as the present description has gone it will be noted that a single lock has been mentioned which controls the unlatching of the cover 77 and simultaneously unlocks the control lever permitting the adjustment of the latter so that the printer button 76, which is exposed when the cover 77 is lifted, may be operated to effect a total printing impression. Nothing has been said as yet about the resetting of the totalizer and other elements to zero. As will be explained it is particularly desirable in connection with large organizations known as "chain stores" to provide a manager for each store and then an auditor with supervision over the accounts of a series of stores, and only the latter should be able to reset the totalizer.

It is desirable in such chain store systems that a record be kept of the sales for each day which may be determined by mental subtraction of successive running totals while periodically, the auditor visits each store to check the amount of the sales for say a month against the cash received during that period after which the auditor resets the totalizer so that it may accumulate the sales relating to a subsequent period.

In the particular machine herein disclosed, the printing mechanism is adapted to print the total of the daily sales together with other related information, this being done by the manager of the store who usually retains the key of the lock 79. While it is desirable that he be permitted to operate the total printing devices it is not desirable that he should have access to this information regarding the total amount of sales entered in the cash register up to a certain point in its operation, and the present invention is particularly concerned with mechanism for preventing such access.

There will be now described the mechanism whereby the manager, after he operates the total printing mechanism to effect a total printing impression may wind up the printed portion of the strip upon a storage roll, the printed record strip, however, being concealed against inspection by the provision of a separate cover which is normally locked and which may be unlatched only by mechanism under control of the auditor as will be described hereinafter in detail.

*Paper winding mechanism*

Referring to Figs 1, 4 and 5, it will be noted that attached to the side plates 56 and 57 of the printer are upwardly extending supporting plates 114 and 115 which are adapted to engage reduced portions 117 (Fig. 4) of a spool or roller 118. Attached to one end of the roller 118 is a knurled knob 119 integral with which is a ratchet wheel 120 against which bears a spring-pressed retrograde pawl 121 (Fig. 1). As shown, the storage roll 118 is located in the front portion of the printer and is adapted to receive the printed portion of the record strip as the same is manually wound thereon.

The storage roll and the entire printing mechanism with the exception of the knob 76 is effectively concealed by means of a supplemental cover 122 (Figs. 1, 2 and 6) which is hinged at 123 to the fixed cover 59. The cover 122 is provided with an aperture 124 through which the printer button 76 projects so that even though the cover 122 is latched the printing mechanism may be manually operated. The cover 122 is provided with side plates 1241 (Fig. 2) effectively concealing the different parts of the printing mechanism, one of the plates 1241 being notched at 125 (Figs. 2 and 6) to permit the knurled knob 119 to project therethrough and so that even though the cover 122 is latched the record strip may be manually wound upon the roller 118. The side plate of the fixed cover 59 is provided with a notch 126 (Fig. 6) it being noted that the notches 125 and 126 are concentric with respect to the pivotal shaft 58 of the printing mechanism so that when the printer is rocked rearwardly to effect a printing impression there will be no interference with the projecting knurled knob 119. The cover 122 is provided with a hook 127 (Fig. 6) integral therewith engaging lug 128 of a pivoted bellcrank latching member 129 so that when the parts are in their normal position (as shown in Fig. 6) the cover 122 will be securely latched.

It is desirable, of course, that a positive means be provided to attach the record strip to the storage roll 118 since, as will be explained hereinafter, the end of the record strip is attached to the roller 118 by the auditor and if, after the auditor left the place of business where the cash register is installed, the record strip should accidentally become detached from the roll the manager would be unable to manually wind the record strip thereon without recalling the auditor.

The storage roll 118 at its mid-portion is provided with a reduced portion 1291 (Figs. 3 and 4) within which fits a semicircular curved plate 130 which as shown in Fig. 3 partly surrounds the reduced portion 1291. Fitting in a socket 131 in the reduced portion 1291 is a spring-pressed plunger 132 bearing against the curved plate 130 so that the ends of the plate will be made to contact with the periphery of the roller 118. When it is desired to attach the record strip to the roller 118 the curved plate 130 is moved against the resistance of the spring-pressed plunger 132 so that the end of the record strip may be inserted between the periphery of the roller 118 and the engaging end of the curved plate 130. By this simple and effective means the end of the record strip is positively attached to the roller 118 and precludes the possibility of the end of the record strip from being detached from the storage roll 118.

After the end of the record strip has been attached to the receiving roller 118 the machine is in a condition for printing totals which the manager does at different times, generally at the end of each day's business.

When the printing button is depressed there will be printed upon the record strip, as shown in Fig. 2, the total of the sales accumulated up to the time the total was printed. It will be noted that in line with the total printing elements 36 (Fig. 2) there is provided a printing block 133 (Fig. 2) bearing the word "total" which prints this word in line with the printed total, thus identifying these printed numerals. Each special counter is also provided with a special printing block 134 which identifies each counter so that suitable indicia and abbreviations will be printed adjacent the numerals, identifying the amounts registered by the various counters. The date printing wheels which have been adjusted by the operator will print the desired date upon the record strip. After the total printing impression has been taken the manager will manually rotate the knurled knob 119 sufficiently to bring the word "total" printed upon the record into visible position in line with a slot 135 formed in the cover 122. This automatically indicates to the operator that sufficient paper has been withdrawn from the supply roll so that a fresh portion is now presented to the printing type.

Resetting devices

At the termination of the desired period the auditor visits the store and unlatches the cover 122 by means which will now be described, in order to permit access to the printed record strip and to perform a resetting operation after having first printed the final total. For this reason there is provided a supplemental lock 136 (Fig. 2) also projecting through the cabinet cover and provided with a cam 137 co-operating with the stud 82 previously referred to and a stud 138 on the shaft 83. When the auditor rotates his key in a clockwise direction it will, on account of the form of the cam 137, shift the shaft 83 to the left as viewed in Fig. 2. This will rock the bell-crank 85 counter-clockwise and will shift the slide 86 rearwardly (Fig. 6) so that through the co-operation of the extension 89 of the slide 86 and an extension 139 of the catch 90 the latter will be operated to release the cover 77. This will permit the auditor to raise the cover 77 and shift the control lever to the "total" position, since the shifting of the shaft 83 to the left also serves to bring the notch 97 in said shaft in the plane of the control lever.

As shown in Fig. 6, the slide 86 is provided with a stud 140 co-operating with a notch 141 formed in the rear end of the catch 129 for the record strip concealing cover 122. It will be obvious, therefore, when the slide 86 is shifted rearwardly it will, through the stud 140, rock the catch 129 thus disengaging the lug 128 from the hook 127 and thereby unlocking the cover 122. This will permit the auditor to obtain access to the printed records carried by the record receiving roller 118, but before the same is withdrawn from the receiving roller it is usually desirable to first print the final total and then reset the machine for operation prior to the accumulation of subsequent entries.

To this end the illustrative machine is provided with a single lever which when given a reciprocation will reset the various elements to their zero positions. The resetting lever 142, as shown in Fig. 1, projects through and works in a slot formed in that part of the cabinet 51 which is located under the cover 77. The resetting lever is loosely mounted upon the shaft 34 and provided with a forward extension 143 (Fig. 1) formed with teeth meshing with the teeth of a gear 144 (Fig. 7). The gear 144 has attached at one side a pinion 145 meshing with a pinion 146 (Fig. 1) movable with the shaft 50 which, it will be remembered, supports the consecutive numbering counter wheels. Also connected to the pinion 144 (Fig. 7) at the other side is a bent disk 147 which co-operates with a spool 148 pinned to the shaft 44, which it will be remembered, supports the totalizer elements 36. Attached to the spool 148 is a pinion 149 which is normally out of the plane of the pinion 145 with which it is adapted to mesh at certain times.

As best shown in Fig. 8, each of the totalizer elements 36 carries a pivoted pawl 150 which is spring-pressed against the shaft 44. The shaft 44 is provided with a series of notches 151 (Fig. 7) which are normally out of the path of the resetting pawls. When the shaft 44 is shifted to bring the notches and pawls into co-operative relationship and then when the shaft is turned, the abrupt walls of the notches will contact with the ends of the pawls 150 and pick up the totalizer elements in whatever position they may be standing at the beginning of the movement of the shaft and carry them around with it, so that a complete revolution of the shaft in such direction will serve to reset the totalizer elements to zero or initial position. This method of resetting is well known in the art and is a common expedient found in cash registers.

The shaft 50 which carries the special counters is provided with a series of notches similar to those in shaft 44 and they are normally in the plane of the resetting pawls carried by the registering elements associated with the "customer" and "no sale" counters so that this shaft need not be shifted laterally. The "reset" counter wheels 52 are not provided with any resetting pawls or associated notches in the supporting shaft 50 so that when the shaft 50 is rotated the "reset" counter elements will not be restored to their zero positions, but will continue to accumulate units.

Summarizing the operation of this mechanism if we assume that the resetting lever is unlocked for operation, it will be obvious that when it is moved from the position shown in Fig. 1, the teeth of the segmental rack 143 carried by the lever will rotate the pinion 144 and the bent disk 147 and due to the co-operation of the bent disk and the collar 148 will bring the pinion 149 in the plane of and into mesh with the teeth of the gear 145 and, furthermore, bring the resetting pawls 150 and notches 151 into co-acting relationship. Further rearward movement of the resetting lever, will, through the gear 145 and gear 149 rotate the shaft 44 to reset the total printing elements. Furthermore, the gear 145 will drive the gear 146 (Fig. 1) and rotate the shaft 50 so that this latter, in co-operation with the pick-up pawls associated with the special counter elements will restore them to their zero positions.

After the resetting lever has been forced rearwardly fully it is again returned to its normal position and will return the shafts to normal positions without affecting the position of the zeroized registering elements.

*Locks and interlocks*

It is desirable to lock the resetting lever against operation until the control lever is shifted to the "total" position, and, furthermore, to prevent a simultaneous operation of the printing mechanism and resetting lever. These results are obtained by mechanism which will now be described.

It will be remembered that the shaft 83 is provided with a notch 98 (Fig. 2) which is normally out of the plane of a semi-circular notch in the resetting lever 142 similar to the notches 95 (Fig. 1) associated with the control lever 78 and is so located that when the manager rotates his lock to shift the shaft 83 to the right to unlock the control lever, the notch 98 will still be out of the plane of the notch formed in the resetting lever. However, whenever the auditor rotates the key of his lock the shaft 83 is shifted to the left thereby bringing the notch 98 in the plane of the control lever 142 and while the resetting lever is partially unlocked at this point it will be finally unlocked only when the total lever is brought to the "total" position as will now be described.

The lever 142 has connected thereto a member 152 (Fig. 1) bifurcated at its forward end to form an open-ended slot 153 to engage the shaft 103 and in addition it is provided with a notch 154 cooperating with the stud 113 of the locking member 102.

From the above it will be evident that when the control lever is in the position shown in Fig. 1 movement of the resetting lever 142 will be prevented by the contacting of the pin 113 with the forward wall of the slot 154.

When the control lever is moved forwardly from the position shown in Fig. 1, the extension 109 co-operating with the pin 110 will rock the locking arm 102 clockwise forcing the pin 113 upwardly out of the slot 154 and unlocking the resetting lever for operation. (See Fig. 11.)

When the control lever is in the "total" position with the pin 113 out of engagement with the slot 154 (Fig. 11) rearward movement of the resetting lever will, by means of a bevel edge 155 (Fig. 1) on the member 152 which is attached to the resetting lever 142 cam the pin 113 upwardly thereby rocking the locking member 102 clockwise to bring a locking edge 156 formed just above the notch 111 of the member 102, in front of the stud 100. In a similar manner referring to Fig. 6 the locking arm 104 will be rocked counter-clockwise to bring a locking surface 157 in front of the locking lug 73. This will positively lock the printer against operation as long as the resetting lever is displaced from its normal position.

It is desirable while printing is being performed that the resetting lever be locked against operation. It will be evident that when the printer is unlocked for operation the pin 100 will register with the notch 111, and when the printing mechanism is moved rearwardly the pin 100 will enter the notch 111 to hold the locking member 102 rigid. The resetting lever 142, will, therefore, be locked against movement since the beveled edge 155 of the member 152 cannot pass under the stud 113 carried by the rigidly held locking member 102.

By the means just described it is impossible to simultaneously operate the printing mechanism and the resetting lever, to effect either any intentional or accidental fraudulent operations of the machine.

Another precautionary device which is included in the illustrative embodiment is mechanism whereby when the control lever is in the "total" position, at which time the resetting lever and printing mechanisms are unlocked, all the operating keys will be locked against movement.

When the control lever 78 is drawn forwardly from the position shown in Fig. 1, it will be seen that a stud 941 carried by the rearward extension of the control lever will co-operate with a cam surface 1161 formed on the underside of the upper end of a spring-pressed locking lever 116. This will rock the locking lever 116 counter-clockwise so that a shoulder 1162 formed at the lower part of the locking lever 116 will engage the flange of the key coupler 22 locking the registering keys against operation as long as the control lever remains in the "total" position. The means just referred to will prevent the simultaneous operation of the keys and either the printing mechanism or the resetting lever.

After the resetting operation has been performed the printing devices may be again operated so as to furnish proof that the desired registering elements again stand at zero. After the proof of the resetting has been obtained and printed upon the record strip the knurled knob 119 should again be manually rotated to withdraw sufficient paper from the paper supply roll to insure that a fresh portion of the record strip stands over the previously zeroized registering wheels.

The printed record strip will now contain the printed totals and other information for the preceding period, and the auditor then operates a finger piece 158 (Fig. 1) to disable the retrograde pawl 121 and permit the printed portion to be unrolled from the storage roll. The printed part is then detached from the rest of the roll and the blank portion of the record strip attached to the receiving roller after which the cover 122 is brought to its normal position. The control lever 78 is now shifted to the desired position and after the lid 77 is closed, the various lids and levers will be locked by reversely rotating the key of the auditor's lock 137. The machine is now conditioned for accumulating items pertaining to another period of business.

*Modification of resetting devices*

When it is desired that the resetting lever be capable of resetting the totalizer elements 36 to zero, a bent disk 147 as illustrated in Fig. 7 will be used in conjunction with the resetting mechanism as already explained. In some classes of business, however, it is frequently desirable that there be no resetting of the totalizer elements, but that the resetting lever be capable only of returning to zero the registering elements associated with the "customer" and "no sale" counters. Where printed totals are obtained but are not followed by subsequent resetting operations, the totals printed will be "running" totals, and the differences between the successively printed totals will be the total of the sales accumulated between the times at which the totals are printed. The totalizer will continue to accumulate the successively entered items until the registering capacity of the totalizer has been reached whereupon the registering wheels will again stand at zero.

Whenever it is desired that no resetting of the totalizer elements 36 shall be performed there is substituted for the bent disk 147 a flat disk 159, best shown in Figs. 1 and 2. The flat disk 159 co-operates with the spool 148, but will, of course, not shift the totalizer supporting shaft 44 laterally to perform resetting of the totalizer elements and only resetting of the "customer" and "no sale", counters will be effected.

Modification of paper winding devices

While the above described mechanism has been found practical in operation and capable of performing the results desired in a facile manner, it is to be understood that this is but one embodiment of the invention and that other modifications may be resorted to.

One modification of the present invention is illustrated in Figs. 9 and 10 of the drawings and will now be described. The plate 57 carries the usual upwardly extending supporting plate 115 (Fig. 10) to which is riveted a transversely extending rod 160 on which loosely rotates a roller 161 having a longitudinal groove 162 with which the usual form of paper retaining key 163 cooperates. By means of the key 163, the end of the record strip is securely attached to the spool 161. The end of the spool is provided with ratchet teeth 164 against which presses a spring-pressed retrograde pawl 165. The end of the paper retaining key 163 cooperates with ratchet teeth of an insertable winding key 166 and to facilitate such cooperation the end of said key 163 is shown comprising oppositely beveled or inclined portions 163', 163" (Fig. 9). The key 166 is adapted to be inserted in an aperture formed in the side plate 1241 of the cover 122 and is provided with a pin 167 adapted to co-operate with a pin 168 carried by a pivoted spring-pressed stop pawl 169.

When this form of the invention is employed and it is desired to wind the printed record strip upon the receiving roller, the key 166 is inserted so that its ratchet teeth co-operate with the end of the paper retaining key, and the key is rotated in a clockwise direction, as viewed in Fig. 9. As the pin 167 rotates, it will engage the pin 168 of the stop pawl 169 rocking the latter clockwise until the pin 168 abuts against the inside of the cover 122 thus positively stopping the rotary movement of the key. This is an automatic indication to the operator that sufficient paper has been withdrawn from the supply roll and since at this time the pin 167 is in alignment with the square notch 170 in the side 124 of the cover the key may then be withdrawn.

Another modification which may be employed to effect the desired results is shown in Figs. 11, 12, 13 and 14 of the drawings and the parts illustrated in these figures which are similar to those illustrated in the prior figures, are denoted by the same reference characters.

In general, the modification of this mechanism is the provision of means whereby through the manipulation of a single operating device the record strip may be printed upon and automatically fed and deposited in a box. It will be noted that in the previously described constructions the legibility of the total printing impression is, to a great extent, dependent upon the force exerted upon the printer button, and if considerable force is used the impression will be heavy, but if the force utilized to operate the button is light the impression will be correspondingly light. Since the manager is not able to read the total and other information he is unable to know whether the impression is legible. In the construction shown in Figs. 11, 12, 13 and 14, the printer button 76 has been omitted and a construction is utilized which permits the printing platen 62 to strike the lines of type carriers with the same force at all times and this to a great extent insures that the imprints will be legible.

In Fig. 11 there is shown a special key 171 designated as a total key which projects through the machine cabinet. Adjacent the key 171 which is mounted upon the key shaft 21 is a member 172 provided with a shoulder 173 normally engaging a lug 174 of an arm 175 which is rigidly attached to the shaft 58 which, it will be remembered, is the pivotal point of the printer frame. To the shaft 58 is rigidly connected an upwardly extending arm 76 bifurcated to receive the locking lug 100 carried by the side frame 56. When the key 171 is depressed a stud 177 attached to the key will engage an extension 178 of the member 172 and at the same time the lug 174 will be positioned over a recess 179 formed in the key 171. Further movement of the key 171 through the pin 177 rocks the member 172 clockwise against the tension of a spring 180 disengaging the shoulder 173 from the lug 174 and permitting a spring 181, which is connected to the arm 175, to rock the shaft 58 counter-clockwise rocking the printer in the same direction so as to bring the platen blocks 61 and 62 against the type carriers. Upon the return movement of the key 171 the cam edge 1821 forward of the recess 179, will engage the lug 174 and thus positively force the printer frame to its normal position.

183 designates a stationary arm which is rigidly held by the shafts 103 and 58 and is provided at its upper end with rack teeth 184 co-operating with the teeth of a pinion 185 loosely mounted upon a stud 186 carried by a bracket 187 attached to the side plate 56. Rigidly secured to the pinion 185 is a segment 188, the teeth of which engage a pinion 189 loosely mounted upon a stub shaft 190 also carried by the bracket 187. The pinion 189 has secured to it a collar 191 provided with a shouldered notch 192 co-operating with a turn-back pawl 193 attached to a gear 194. The gear 194 meshes with a similar gear 195 (Fig. 13) attached to a shaft 196 provided with a feeding roller 197.

Rigidly secured to the printer frame is a receptacle 198 (Fig. 12) of box-like formation to which is pivoted a spring-pressed cover 199 which carries at its upper ends brackets 200 forming the pivotal supports of a transversely extending shaft carrying a feeding roller 201 which projects through an aperture formed in a cover 199 and co-operates with the feeding roller 197. As shown in Fig. 12, the record strip passes between these two rollers and is fed into the detachable box which is concealed by the cover 122.

It will be clear that when the printer frame is rocked rearwardly to effect a total printing impression, the pinion 185 rolling over the fixed segment 184 will be rocked counter-clockwise, as viewed in Fig. 13, and through the segment 188 will drive the gear 189 clockwise. This will give a full revolution of the collar 191 so that the pawl 193 again co-operates with the notch 192 of the collar 191. When the printer frame is returned to its normal position the segment 188 will reversely rotate the pinion 189 and collar 191 and by the engagement of the shoulder 192 with the pawl 193 will drive the gear 194 counter-clockwise thereby rotating the gear 195 in an opposite direction so that the record strip which passes between the feeding rollers 197 and 201 will be fed and deposited in the box 198.

It will be noted in Fig. 11 that the total printing key 171 projects through the machine cabinet similar to the amount keys, and is, of course accessible to the operators of the machine. It will be remembered, however, that when the control lever is not in the "total" printing position the locking lug 100 is in locking relationship with the locking member 102 so that the printer is locked against movement even though the total printing key 171 should be improperly operated.

General summary of operation

The nature of the improved mechanism is such that in order to make the foregoing description as clear as possible it was necessary to state the operation considerably in detail as an incident to explaining the various features of construction. A complete re-statement here of the operation is therefore, believed to be unnecessary. However, a résumé of the general operation of the machine will now be given to co-ordinate the operations and functions of the various parts which have been described in detail.

It will be assumed that the machine is conditioned for accumulating items which will require the positioning of the control lever 78 (Fig. 1) out of the "total" position and the cabinet lids 77 and 122 will be in their normal positions in which they are locked by means under the control of the locks 79 and 136 (Fig. 2).

The operator enters the desired amount by depressing the appropriate amount key or keys so that when the keys are depressed the key coupler 22 (Fig. 1) will be rocked and the flange 23 of the coupler will engage the notches 24 of the depressed keys, and by means of the rack plate 26 will drive the shaft 28. The cam 43 (Fig. 1) will then draw the bar 38 rearwardly rocking the totalizer pinions 35 into mesh with the segmental racks which are then differentially operated by means of the rollers 30 working in the cam slots 31 of the cam plates 32. On the return of the keys to normal the totalizer pinions will be disengaged from the racks so that the return movement of the latter will not affect the amount registered. The various cash transactions will be entered in the machine in the manner which has just been explained so that at the end of a given period, the differentially adjusted totalizer wheels 36 will represent the amounts which have been entered in the machine.

When the manager desires at the end of this period to obtain a total imprint upon the record strip he inserts his key in the lock 79 (Fig. 2) turning the bolt clockwise so that the cam 80 working upon the studs 81 and 82 will shift the shaft 83 to the right. Through the bell-crank 85 it will force the plate 86 forwardly and the extension 89 (Fig. 6) co-operating with the cam portion 93 will rock the catch 90 counter-clockwise so as to disengage it from the stud 92. The unlocked cover 77 may now be lifted upwardly to give access to the control lever 78. When the shaft 83 is shifted to the right the notch 96 (Fig. 2) is brought in the plane of the control lever 78 permitting the manager to bring it forwardly to the "total" position (Fig. 11).

The date setting wheels 45, (Fig. 2) if they are not already adjusted, are adjusted to their proper positions so that the desired date will be printed upon the record strip by the printing wheels 49.

When the control lever 78 is brought to the "total" position the member 106 (Fig. 1) is moved forwardly and downwardly so that the projection 109 contacting with the stud 110 will rock the locking member 102 in a clockwise direction bringing the notch 111 to register with the locking stud 100 (Fig. 11) and as shown in Fig. 6, will bring the notch 112 into co-operating relationship with the locking lug 73.

To effect a total printing impression the button 76 is sharply depressed so that the rubber impression blocks 61 and 62 will strike their associated printing lines of type comprising the totalizer elements, the special counter elements and the special printing blocks 133 and 134 (Fig. 2) and thus forcing the paper against the inking ribbon and the type carriers.

Previous to this, the record strip will have been attached to the receiving roll 118 by means of the clamp 130 (Fig. 3) so that after the printing impression has been effected the person taking the total imprint may manually rotate the knob 119 sufficiently to cause the word "total" to appear in the slot 135 (Fig. 2) formed in the cover 122. This indicates to the operator that sufficient paper has been withdrawn from the supply roll so that a fresh portion is now presented to the printing type. By the provision of the cover 122 the person effecting the total printing impression will be unable to ascertain the information printed upon the record strip.

After this operation has been performed the total lever 78 is brought out of the "total" position, the cover 77 restored to its normal position and the key of the lock 79 (Fig. 2) reversely rotated thereby latching the cover and the control lever in their proper positions.

This completes the successive item entering operations and the subsequent total printing operation for an arbitrary period, and the operations just described are repeated for a number of similar periods so that at the end of a longer period there will be printed upon the record strip, wound upon the receiving roller, the necessary information for the analysis of sales during such longer period. At the desired time the auditor visits the store and inserts his key in the bolt of the lock 136 (Fig. 2) so that the cam co-operating with the stud 82 and the stud 138 will shift the shaft 83 to the left. This will rock the bell-crank 85 counter-clockwise and will shift the slide 86 rearwardly (Fig. 6) and through the co-operation of the extension 89 and the extension 139 of the catch 90 will operate the cover catch to release the cover 77. Simultaneously when the shaft 83 is shifted to the left it brings the notch 97 (Fig. 2) in the plane of the control lever and the notch 98 in the plane of the resetting lever 142 unlocking the latter for operation. The auditor will then raise the cover 77 and shift the control lever to the "total" position to unlock the printing mechanism for operation as previously described and furthermore, since the extension 109 co-operates with the pin 110 it will rock the locking arm 102 clockwise forcing the pin 113 upwardly out of the slot 154 and unlocking the resetting lever at this point.

The auditor after first printing the final total will restore the total printing elements to zero by moving the resetting lever 142 rearwardly so that the teeth of the segmental rack 143 carried by the lever will rotate the pinion 144 (Fig. 7), and the bent disk 147 and due to the co-operation of the bent disk 147 with the collar 148 will bring the pinion 149 in the plane and into mesh with the teeth of the gear 145, and, furthermore, bring the resetting pawls 150 and notches 151 into co-acting relationship (Fig. 8). Further rearward movement of the resetting lever will, through the gear 145 and gear 149 rotate the shaft 44 to reset the total printing elements. Furthermore, the gear 145 will drive the gear 146 (Fig. 1) and rotate the shaft 50 so that the latter, in co-operation with the pick-up pawls associated with the special counter elements 53 and 54, will restore them to their zero positions.

When the resetting lever is moved rearwardly the beveled edge 155 (Fig. 11) on the member 152 which is attached to the resetting lever 142, will cam the pin 113 upwardly, thereby rocking the locking member 102 clockwise to bring the locking edge 156 formed just above the notch 111 in front of the stud 100. In a similar manner the locking arm 104 (Fig. 6) will be rocked counter-clockwise to bring the locking surface 157 in front of the locking lug 73. This will positively lock the printer against operation as long as the resetting lever is displaced from its normal position.

After the resetting operation has been performed the printing devices are again operated so that a proof will be obtained that the totalizer elements now stand at zero, and after the proof of the resetting has been obtained and printed upon the record strip, the knurled knob 119 will again be manually rotated to withdraw sufficient paper from the supply roll to insure that a fresh portion of the record strip again stands over the zeroized registering wheels.

When the printing devices are moved rearwardly the pin 100 will enter the notch 111 to hold the locking member 102 against rocking. The resetting lever 142 will, therefore, be locked against movement since the beveled edge 155 of the member 152 cannot pass under the stud 113 carried by the rigidly held locking member 102.

The cover 122 will now be raised, since it was unlocked by the rearward movement of the slide 86 through the co-action of the stud 140 (Fig. 6) with the cam slot 141, in the extension of the catch 129 serving to disengage the lug 128 from the hook 127.

When the cover 122 is raised the auditor operates the finger-piece 158 to disable the retrograde pawl 121 (Fig. 1) permitting the printed portion to be withdrawn from the storage roll. After the printed part is detached from the rest of the roll, the end of the blank record strip is attached to the receiving roll, after which the cover 122 is brought to its normal position. The control lever 78 is now shifted to its desired position and after the lid 77 is closed the key of the lock 136 is reversely rotated. The machine is now conditioned for accumulating items pertaining to another period of business.

While the form of mechanism herein shown and described is admirably adapted to fulfill the objects primarily stated it is to be understood that it is not intended to confine the invention to the forms of embodiment herein shown, since it may be embodied in various forms, all coming within the scope of the claims which follow.

What is claimed is:

1. In a machine of the class described, the combination of a printing totalizer, a printing mechanism for effecting total printing impressions from the printing totalizer upon a record bearing material, means for normally locking the printing mechanism, manual means normally inaccessible for disabling the locking mechanisms, means whereby the total printed upon the record strip is concealed from view, and a supplemental means capable of disabling the concealing devices and rendering said manual means accessible.

2. In a machine of the class described, the combination of a printing totalizer, a printing mechanism for effecting printing impressions from the printing totalizer, means for normally locking the printing mechanism, a resetting device for the totalizer, means for normally locking the resetting device, devices for concealing the printed impressions, a manual means for disabling the printing locking means, and a supplemental manual means for simultaneously disabling the resetting locking means and the concealing devices.

3. In a machine of the class described, the combination of a printing totalizer, a printing mechanism for effecting printing impressions from the printing totalizer, means for normally locking the printing mechanism, a resetting device for the totalizer, means for normally locking the resetting device, devices for concealing the printing impressions, a manual means for disabling the printer locking means, a supplemental manual means for simultaneously disabling the resetting locking means, and the concealing devices, and an interlocking mechanism between the printing mechanism and the resetting device for preventing their simultaneous operation.

4. In a machine of the class described, the combination of a printing totalizer, a movable printer for effecting printing impressions upon the record material, means for moving the printer for effecting printing impressions upon the record strip, a record receiving roller, manual means for winding the printed record strip upon the receiving roller, a normally locked shield for concealing the printed impressions from view, means for releasing said shield and means for indicating when sufficient paper has been wound upon the receiving roller.

5. In a machine of the class described, the combination of a series of type carriers, a printing mechanism for effecting printing impressions upon a record material, means for concealing the printed impressions from view, means for advancing the printed record material and indicating means comprising an opening in said concealing means, and indicia which registers with said opening when sufficient material has been advanced.

6. In a machine of the class described, the combination of a series of type carriers, a record strip, a printer movable towards the type carriers for effecting printing impressions upon the record strip, a plurality of normally locked shields for preventing access to the printing mechanism and for concealing the record strip, means for releasing said shields, a manipulative device projecting through the shields for advancing the printed record strip, and slots in the shields co-operative with the manipulative device.

7. In a machine of the class described, the combination of a cabinet, a plurality of lids hinged thereto, separate and independent latches for the lids, an actuating device for the latches so arranged that when the actuating device is shifted in one direction all the latches will be disabled but when shifted in another direction only one latch will be disabled.

8. In a machine of the class described, the combination of a cabinet, a plurality of lids hinged thereto, separate and independent latches for the lids, an actuating device for the latches so arranged that when the actuating device is shifted in one direction all the latches will be disabled, but when shifted in another direction only one latch will be disabled, and separate and independent manually controlled means for moving the actuating device in the desired direction.

9. In a machine of the class described, the combination of a movable printer, a series of type carriers, a record strip supply roll carried by the printer, a record receiving roll carried by the printer, means for manually moving the printer relative to the type carrier for effecting printing impressions, a normally locked shield adapted to conceal the printed impressions upon the record material, means for releasing said shield thereby rendering said printed impression visible, manual means for winding the printed record strip upon the receiving roller and means for indicating when sufficient paper has been withdrawn from the supply roll.

10. In a machine of the class described, a series of printing elements, means for taking an impression from said elements upon a record strip, and means for advancing the record strip after an impression has been taken comprising a rotatable receiving element, a detachable key adapted to be inserted for rotating said element, means for preventing detachment of said key unless said element is brought to a predetermined position, and means for positively arresting the element in such position.

11. In a machine of the class described, the combination of a printing totalizer, a normally locked printing mechanism for effecting total printing impressions from the printing totalizer upon a record bearing material, normally locked manual means for unlocking the printing mechanism, normally locked means for concealing said record material, and a common member for controlling locking and release of said manual means and concealing means.

12. In a machine of the class described, the combination of a printing totalizer, a normally locked printer movable to effect a total printing impression from the printing totalizer upon a record bearing material, a normally locked shield for preventing operation of said printer, key operated means for releasing said shield, manual means for unlocking the printer, and means independent of said shield whereby the total printed upon the record strip is concealed from view.

13. In a machine of the class described, a record strip, manual means for feeding said strip, a printer having means for printing secret characters upon said strip and for printing a special character thereon indicating the position of the secret characters, and a shield overlying said record strip for concealing the secret characters from view, but adapted to expose the special character.

14. In a machine of the class described the combination of printing wheels, a movable printing mechanism for effecting total printing impressions from the printing wheels upon a record bearing material, an actuator therefor, means for locking the actuator against movement, means for winding the printed record bearing material upon a receiving roller, a normally locked shield for concealing the record material from view during the paper winding operation, and means, having parts in common with the first means, for releasing the shield.

15. In a machine of the class described, a printing and feeding mechanism including means to print data on a record strip, the data including information intended to be kept secret and a special character, means to advance the strip to place an unused portion of the same adjacent the printing mechanism, means to conceal the information from view during the entire advancing of the strip, and means to conceal the special character from view until the paper is sufficiently advanced, so that the position of the secret information may be determined without revealing its identity.

In witness whereof I have signed my name hereto this 30th day of June, 1926.

CHARLES W. GREEN.